(12) United States Patent
McCollum et al.

(10) Patent No.: US 6,509,407 B2
(45) Date of Patent: Jan. 21, 2003

(54) ELECTRODEPOSITABLE COATING COMPOSITIONS COMPRISING AMINE SALT GROUP-CONTAINING POLYMERS PREPARED BY ATOM TRANSFER RADICAL POLYMERIZATION

(75) Inventors: Gregory J. McCollum, Gibsonia, PA (US); Linda K. Anderson, Pittsburgh, PA (US); Simion Coca, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/044,574

(22) Filed: Jan. 11, 2002

(65) Prior Publication Data

US 2002/0099130 A1 Jul. 25, 2002

Related U.S. Application Data

(62) Division of application No. 09/375,018, filed on Aug. 16, 1999, now Pat. No. 6,355,729.
(60) Provisional application No. 60/098,618, filed on Aug. 31, 1998.

(51) Int. Cl.$^7$ .................................................. C08F 8/32
(52) U.S. Cl. ........................ 524/507; 427/458; 524/548; 524/555; 524/558; 525/123; 525/327.3; 525/328.9; 525/379
(58) Field of Search .................... 524/507, 548, 524/555, 558; 525/123, 327.3, 328.8, 379; 427/458

(56) References Cited

U.S. PATENT DOCUMENTS

| | | | |
|---|---|---|---|
| 3,947,338 A | 3/1976 | Jerabek et al. | 204/181 |
| 3,984,299 A | 10/1976 | Jerabek | 204/181 |
| 4,857,580 A | 8/1989 | Patzschke et al. | 524/507 |
| 5,763,548 A | 6/1998 | Matyjaszewski et al. | 526/135 |
| 5,789,487 A | 8/1998 | Matyjaszewski et al. | 525/301 |
| 5,807,937 A | 9/1998 | Matyjaszewski et al. | 526/135 |
| 6,031,028 A | 2/2000 | Iino et al. | 523/412 |
| 6,191,225 B1 | 2/2001 | Barkac et al. | 525/208 |
| 6,265,489 B1 | 7/2001 | Barkac et al. | 525/119 |
| 6,306,965 B1 | 10/2001 | Anderson et al. | 525/100 |
| 6,319,967 B1 | 11/2001 | Coca et al. | 523/436 |
| 6,319,987 B1 | 11/2001 | White et al. | 525/92 K |
| 6,319,988 B1 | 11/2001 | Barkac et al. | 525/123 |
| 6,339,126 B1 | 1/2002 | Barkac et al. | 525/66 |
| 6,365,666 B1 | 4/2002 | McCollum et al. | 524/548 |

FOREIGN PATENT DOCUMENTS

| | | |
|---|---|---|
| WO | WO 96/30421 | 10/1996 |
| WO | WO 97/18247 | 5/1997 |
| WO | WO 98/01480 | 1/1998 |
| WO | WO 98/40415 | 9/1998 |

*Primary Examiner*—Bernard Lipman
(74) *Attorney, Agent, or Firm*—William J. Uhl; James R. Franks

(57) ABSTRACT

Disclosed are thermosetting compositions which are comprised of a resinous phase dispersed in an aqueous medium, the resinous phase comprising (a) an ungelled active hydrogen group-containing polymer which contains amine salt groups, the polymer having been prepared by atom transfer radical polymerization in the presence of an initiator having at least one radically transferable group, and (b) a curing agent having at least two functional groups which are reactive with the active hydrogen groups of (a). The active hydrogen group-containing polymers of the thermosetting compositions, which are prepared by atom transfer radical polymerization, have narrow molecular weight distributions and well-defined, specifically tailored polymer architecture which can provide enhanced crosslink density and dispersibility of the thermosetting compositions. Also disclosed is a method of electrocoating a conductive substrate using the thermosetting compositions of the invention, and a substrate coated by this method.

28 Claims, No Drawings

ELECTRODEPOSITABLE COATING COMPOSITIONS COMPRISING AMINE SALT GROUP-CONTAINING POLYMERS PREPARED BY ATOM TRANSFER RADICAL POLYMERIZATION

CROSS-REFERENCE TO RELATED APPLICATION

This application is a division of U.S. patent application Ser. No. 09/375,018 filed Aug. 16, 1999, now U.S. Pat. No. 6,355,729, which claims the benefit of U.S. Provisional Application Serial No. 60/098,618, filed Aug. 31, 1998, which are hereby incorporated by reference in their entirety.

FIELD OF THE INVENTION

The present invention relates to thermosetting compositions comprised of active hydrogen-containing polymers which contain amine salt groups, and curing agents therefor which are reactive with the active hydrogen groups of the polymer. The active hydrogen-containing polymers are prepared by atom transfer radical polymerization, and have well defined polymer chain structures, molecular weights and molecular weight distributions. The invention also relates to methods of electrocoating conductive substrates and to substrates electrocoated by such methods.

BACKGROUND OF THE INVENTION

Electrodeposition as a coating application method involves deposition of a film-forming composition onto a conductive substrate under the influence of an applied electrical potential. Electrodeposition has become increasingly important in the coatings industry because, by comparison with non-electrophoretic coating means, electrodeposition offers increased paint utilization, improved corrosion protection and low environmental contamination.

Initially, electrodeposition was conducted with the workpiece being coated serving as the anode. This was familiarly referred to as anionic electrodeposition. However, in 1972, cationic electrodeposition was introduced commercially. Since that time, cationic electrodeposition has steadily gained in popularity and today is by far the most prevalent method of electrodeposition. Throughout the world, more than 80 percent of all motor vehicles produced are given a primer coating by cationic electrodeposition.

Electrodepositable coating compositions comprising active hydrogen-containing polymers which contain amine salt groups are known and have been developed for use, inter alia, in electrodepositable automotive OEM primer coatings. Such electrodepositable coating compositions typically comprise a crosslinking agent having at least two functional groups that are reactive with active hydrogen groups, and an active hydrogen-containing polymer which contains amine salt groups. The polymers used in such electrodepositable coating compositions are typically prepared by condensation reactions or by conventional, i.e., non-living, radical polymerization methods, which provide little control over molecular weight, molecular weight distribution and polymer chain structure.

Many physical properties, e.g., viscosity, of a given polymer can be directly related to its molecular weight. Higher molecular weights are typically associated with, for example, higher glass transition temperature (Tg) values and viscosities.

The physical properties of a polymer having a broad molecular weight distribution, e.g., having a polydispersity index (PDI) in excess of 2.5, can be characterized as an average of the individual physical properties of and indeterminate interactions between the various polymeric species that comprise it. As such, the physical properties of polymers having broad molecular weight distributions can be variable and hard to control.

The polymer chain structure, or architecture, of a polymer can be described as the sequence of monomer residues along the polymer back bone or chain. An active hydrogen containing polymer containing amine salt groups prepared by standard radical polymerization techniques will contain a mixture of polymer molecules having, for example, varying individual hydroxyl and amine salt group equivalent weights and varying polymer chain structures. In such a copolymer, the amine salt groups and the hydroxyl groups are located randomly along the polymer chain. Moreover, the number of functional groups is not divided equally among the polymer molecules, such that some fraction of the polymer molecules may actually be free of amine salt groups and/or hydroxyl groups.

In any thermosetting composition, the formation of a three-dimensional crosslinked network is dependent upon the functional equivalent weight, e.g. hydroxyl equivalent weight, as well as the architecture of the individual polymer molecules that comprise it. Polymer molecules having little or no reactive functionality (or having functional groups that are unlikely to participate in crosslinking reactions due to their locations along the polymer chain) will contribute little or nothing to the formation of the three-dimensional crosslinked network, resulting in decreased crosslink density and less than optimum physical properties of the resultant cured film.

An electrodepositable coating composition is comprised of a resinous phase dispersed in an aqueous medium. Polymer molecules of the resinous phase typically contain an ionic species, e.g. amine salt groups, to facilitate dispersion of the polymer in the aqueous medium. Polymer fractions having few or no ionic groups will be more difficult to disperse in the aqueous medium, resulting in poorer stability of the electrodeposition bath and poorer appearance of the resultant electrodeposited coating.

The continued development of new and improved electrodepositable coating compositions which provide stable electrodeposition baths and a combination of favorable coating performance properties is desirable. In particular, it would be desirable to develop thermosetting compositions that comprise active hydrogen-containing polymers which contain amine salt groups, the polymer having well-defined molecular weights and tailored polymer chain structure, and narrow molecular weight distributions, for example, PDI values less than 2.5. Such compositions would have efficient dispersibility and a combination of favorable performance properties, particularly in electrodepositable coatings applications.

U.S. Pat. Nos. 5,789,487 and 5,763,548 and International Patent Publication WO 97/18247 describe a radical polymerization process referred to as "atom transfer radical polymerization" (ATRP). The ATRP process is described as a living radical polymerization that results in the formation of polymers having predictable molecular weight and molecular weight distribution. The ATRP process of these publications is also described as providing highly uniform products having controlled structure (i.e., controllable topology, composition, etc.). These patent publications also describe polymers prepared by ATRP, which are useful in a wide variety of applications, for example, in paints and coatings.

SUMMARY OF THE INVENTION

In accordance with the present invention, provided is a thermosetting composition comprising a resinous phase dispersed in an aqueous medium, the resinous phase comprised of the following components:

(a) an ungelled active hydrogen group-containing polymer prepared by atom transfer radical polymerization in the presence of an initiator having at least one radically transferable group, wherein the polymer contains at least one of the following polymer chain structures:

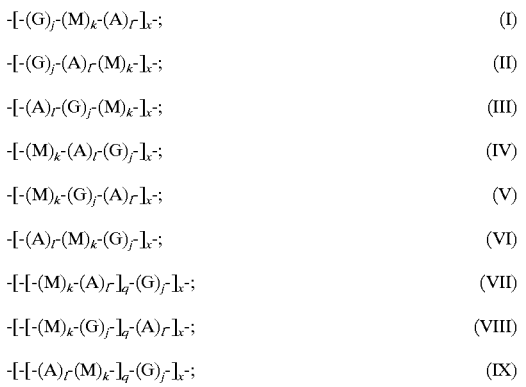

or

-[-[-(G)$_j$-(M)$_k$-]$_q$-(A)$_r$-]$_x$-;  (X)

where j, k, l, q and x, each are independently selected for each structure such that the polymer has a number average molecular weight of at least 250, as determined by gel permeation chromatography using a polystyrene standard; G is a residue of at least one ethylenically unsaturated radically polymerizable monomer, said residue containing amine salt groups; A is a residue of at least one ethylenically unsaturated radically polymerizable monomer, said residue containing active hydrogen groups and being free of amine salt groups; and M is a residue of at least one ethylenically unsaturated radically polymerizable monomer and is different from G and A; and (b) a curing agent having at least two functional groups which are reactive with the active hydrogen groups of (a).

Additionally provided are methods of electrocoating a conductive substrate serving as a cathode in an electrical circuit using the thermosetting compositions described above. Substrates coated by these methods are also provided.

Other than in the operating examples, or where otherwise indicated, all numbers expressing quantities of ingredients or reaction conditions used in the specification and claims are to be understood as modified in all instances by the term "about." As used herein, the term "polymer" is meant to refer to oligomers and both homopolymers, i.e., polymers made from a single monomer species, and copolymers, i.e., polymers made from two or more monomer species.

DETAILED DESCRIPTION OF THE INVENTION

As described above, the active hydrogen group-containing polymer which contains amine salt groups used in the thermosetting compositions of the present invention is an ungelled polymer prepared by atom transfer radical polymerization (ATRP) in the presence of an initiator having at least one radically transferable group.

The ATRP method is described as a "living polymerization," i.e., a chain-growth polymerization that propagates with minimal chain transfer and minimal chain termination. The molecular weight of a polymer prepared by ATRP can be controlled by the stoichiometry of the reactants, i.e., the initial concentration of monomer(s) and initiators). In addition, ATRP also provides polymers having characteristics including, for example, narrow molecular weight distributions, that is, PDI values less than 2.5, and well defined polymer chain structure, e.g., block copolymers and alternating copolymers.

The ATRP process can be described generally as comprising: polymerizing one or more radically polymerizable monomers in the presence of an initiation system; forming a polymer; and optionally isolating the formed polymer. The initiation system comprises: an initiator having a radically transferable atom or group; a transition metal compound, i.e., a catalyst, which participates in a reversible redox cycle with the initiator; and a ligand, which coordinates with the transition metal compound. The ATRP process is described in further detail in the aforementioned U.S. Pat. Nos. 5,789,487 and 5,763,548 and International Patent Publication WO 97/18247.

By "ungelled" is meant that the polymer is substantially free of crosslinking and has an intrinsic viscosity when dissolved in a suitable solvent. The intrinsic viscosity of a polymer is an indication of its molecular weight. A gelled polymer, on the other hand, since it is of essentially infinitely high molecular weight, will have an intrinsic viscosity too high to measure.

In preparing the active hydrogen group-containing polymers of the present invention, the initiator may be selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable group, typically a halo group. The initiator may also be substituted with functional groups, e.g., oxiranyl groups, such as glycidyl groups. Additional useful initiators and the various radically transferable groups that may be associated with them are described on pages 42 through 45 of International Patent Publication WO 97/18247.

Polymeric compounds (including oligomeric compounds) having radically transferable groups may be used as initiators, and are herein referred to as "macroinitiators." Examples of macroinitiators include, but are not limited to, polystyrene prepared by cationic polymerization and having a terminal halide, e.g., chloride, and a polymer of 2-(2-bromopropionoxy)ethyl acrylate and one or more alkyl (meth)acrylates, e.g., butyl acrylate, prepared by conventional non-living radical polymerization. Macroinitiators can be used in the ATRP process to prepare graft polymers, such as grafted block copolymers and comb copolymers. A further discussion of macroinitiators is found on pages 31 through 38 of International Patent Publication WO 98/01480.

Preferably, the initiator may be selected from the group consisting of halomethane, methylenedihalide, haloform, carbon tetrahalide, methanesulfonyl halide, p-toluenesulfonyl halide, methanesulfenyl halide, p-toluenesulfenyl halide, 1-phenylethyl halide, 2-halopropionitrile, $C_1$–$C_6$-alkyl ester of 2-halo-$C_1$–$C_6$-carboxylic acid, p-halomethylstyrene, mono-hexakis(α-halo-$C_1$–$C_6$-alkyl)benzene, diethylhalomethyl malonate, and mixtures thereof. A particularly preferred initiator is diethyl-2-bromo-2-methyl malonate.

Catalysts that may be used in preparing the active hydrogen group-containing polymers of the present invention, include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following general formula:

$$TM^{n+}X_n$$

wherein TM is the transition metal, n is the formal charge on the transition metal having a value of from 0 to 7, and X is a counterion or covalently bonded component. Examples of the transition metal (TM) include, but are not limited to, Cu, Au, Ag, Hg, Pd, Pt, Co, Mn, Ru, Mo, Nb, Zn and Fe. Examples of X include, but are not limited to, halogen, hydroxy, oxygen, $C_1$–$C_6$-alkoxy, cyano, cyanato, thiocyanato and azido. A preferred transition metal is Cu(I) and X is preferably halogen, e.g., chloride. Accordingly, a preferred class of transition metal catalysts are the copper halides, e.g., Cu(I)Cl. It is also preferred that the transition metal catalyst contain a small amount, e.g., 1 mole percent, of a redox conjugate, for example, Cu(II)$Cl_2$ when Cu(I)Cl is used. Additional catalysts useful in preparing the active hydrogen group-containing polymers of the present invention are described on pages 45 and 46 of international patent publication WO 97/18247. Redox conjugates are described on pages 27 through 33 of International Patent Publication WO 97/18247.

Ligands that may be used in preparing the active hydrogen group-containing polymers of the present invention, include, but are not limited to compounds having one or more nitrogen, oxygen, phosphorus and/or sulfur atoms, which can coordinate to the transition metal catalyst compound, e.g., through sigma and/or pi bonds. Classes of useful ligands, include but are not limited to, unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl (meth)acrylates. A preferred class of ligands are the substituted bipyridines, e.g., 4,4'-dialkyl-bipyridyls. Additional ligands that may be used in preparing the active hydrogen group-containing polymers of the present invention are described on pages 46 through 53 of International Patent Publication WO 97/18247.

In preparing the active hydrogen group-containing polymers of the present invention the amounts and relative proportions of initiator, transition metal compound and ligand are those for which ATRP is most effectively performed. The amount of initiator used can vary widely and is typically present in the reaction medium in a concentration of from $10^{-4}$ moles/liter (M) to 3 M, for example, from $10^{-3}$ M to $10^{-1}$ M. As the molecular weight of the active hydrogen group-containing polymer can be directly related to the relative concentrations of initiator and monomer(s), the molar ratio of initiator to monomer is an important factor in polymer preparation. The molar ratio of initiator to monomer is typically within the range of $10^{-4}$:1 to 0.5:1, for example, $10^{-3}$:1 to $5 \times 10^{-2}$:1.

In preparing the active hydrogen group-containing polymers of the present invention, the molar ratio of transition metal compound to initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

Active hydrogen group-containing polymers useful in the thermosetting compositions of the present invention may be prepared in the absence of solvent, i.e., by means of a bulk polymerization process. Generally, these polymers are prepared in the presence of a solvent, typically water and/or an organic solvent. Classes of useful organic solvents include, but are not limited to, ethers, cyclic ethers, $C_5$–$C_{10}$ alkanes, $C_5$–$C_8$ cycloalkanes, aromatic hydrocarbon solvents, halogenated hydrocarbon solvents, amides, nitriles, sulfoxides, sulfones and mixtures thereof. A preferred class of solvents is the aromatic hydrocarbons, particularly preferred examples of which include xylene and SOLVESSO 100, a blend of aromatic hydrocarbon solvents available from Exxon Chemicals America. Supercritical solvents, such as $CO_2$, $C_1$–$C_4$ alkanes and fluorocarbons, may also be employed. Additional solvents are described in further detail on pages 53 through 56 of International Patent Publication WO 97/18247.

The active hydrogen group-containing polymer is typically prepared at a reaction temperature within the range of 25° C. to 140° C., e.g., from 50° C. to 100° C., and a pressure within the range of 1 to 100 atmospheres, typically at 1 atmosphere. The atom transfer radical polymerization is typically completed in less than 24 hours, e.g., between 1 and 8 hours.

The active hydrogen group-containing polymer typically has a solids (as measured by placing a 1 gram sample in a 110° C. oven for 60 minutes) of at least 50 percent, and preferably at least 65 percent, by weight based on total polymer weight.

Prior to use, in the thermosetting compositions of the present invention, the ATRP transition metal catalyst and its associated ligand are typically separated or removed from the active hydrogen group-containing polymer. Removal of the ATRP catalyst is achieved using known methods, including, for example, adding a catalyst binding agent to the a mixture of the polymer, solvent and catalyst, followed by filtering. Examples of suitable catalyst binding agents include, for example, alumina, silica, clay or a combination thereof. A mixture of the polymer, solvent and ATRP catalyst may be passed through a bed of catalyst binding agent. Alternatively, the ATRP catalyst may be oxidized in situ and retained in the active hydrogen group-containing polymer.

The active hydrogen group-containing polymer may be selected from the group consisting of linear polymers, branched polymers, hyperbranched polymers, star polymers, graft polymers and mixtures thereof. The form, or gross architecture, of the polymer can be controlled by the choice of initiator and monomers used in its preparation. Linear active hydrogen group-containing polymers may be prepared by using initiators having one or two radically transferable groups, e.g., diethylhalomethyl malonate and α,α'-dichloroxylene. Branched active hydrogen group-containing polymers may be prepared by using branching monomers, i.e., monomers containing radically transferable groups or more than one ethylenically unsaturated radically polymerizable group, e.g., 2-(2-bromopropionoxy)ethyl acrylate, p-chloromethylstyrene and diethyleneglycol bis (methacrylate). Hyperbranched active hydrogen group-containing polymers may be prepared by increasing the amount of branching monomer used.

Active hydrogen group-containing star polymers may be prepared using initiators having three or more radically transferable groups, e.g., hexakis(bromomethyl)benzene. As is known to those of ordinary skill in the art, star polymers may be prepared by core-arm or arm-core methods. In the core-arm method, the star polymer is prepared by polymerizing monomers in the presence of the polyfunctional initiator, e.g., hexakis(bromomethyl)benzene. Polymer chains, or arms, of similar composition and architecture grow out from the initiator core, in the core-arm method.

In the arm-core method, the arms are prepared separately from the core and optionally may have different compositions, architecture, molecular weight and PDI's. For example, the arms may have different hydroxyl equivalent weights, and some may be prepared without any hydroxyl functionality. After the preparation of the arms, they are attached to the core. For example, the arms may be prepared by ATRP using glycidyl functional initiators. These arms can then be attached to a core having three or more active hydrogen groups that are reactive with epoxides, e.g., carboxylic acid or hydroxyl groups. The core can be a molecule, such as citric acid, or a core-arm star polymer prepared by ATRP and having terminal reactive hydrogen containing groups, e.g., carboxylic acid, thiol or hydroxyl groups. The reactive hydrogen groups of the core may react with the residue of the glycidyl functional initiator or with, for example, epoxy functionality along the backbone of the arms.

An example of a core prepared by ATRP methods that can be used as a core in an ATRP arm-core star polymer is described as follows. In the first stage, 6 moles of methyl methacrylate are polymerized in the presence of one mole of 1,3,5-tris(bromomethyl)benzene. In the second stage 3 moles of 2-hydroxyethyl methacrylate are fed to the reaction mixture. The core having terminal residues of 2-hydroxyethyl methacrylate is isolated and then in the third stage reacted with a cyclic anhydride, such as succinic anhydride. In the final stage, three epoxy functional polymeric arms of varying or equivalent composition and at least one of which has been prepared by ATRP, are connected to the carboxylic acid terminated core by reaction between the carboxylic acid groups of the core and the epoxy functionality of the arms.

Active hydrogen group-containing polymers in the form of graft polymers may be prepared using a macroinitiator, as previously described herein. Graft, branched, hyperbranched and star polymers are described in further detail on pages 79 through 91 of International Patent Publication Wo 97/18247.

The polydispersity indices (PDI) of active hydrogen group-containing polymers useful in the present invention, prior to amine salt group formation, are typically less than 2.5, preferably less than 1.8, and more preferably less than 1.5. As used herein, and in the claims, "polydispersity index" is determined from the following equation: (the weight average molecular weight (Mw)/number average molecular weight (Mn)). A monodisperse polymer has a PDI of 1.0. Further, as used herein, Mn and Mw are determined from gel permeation chromatography using polystyrene standards.

Generally, the polymer chain structures I through X, together or separately, represent one or more structures that comprise the polymer chain, or back bone, architecture of the active hydrogen group-containing polymer. Subscripts j, k and l of general polymer chain structures I through X represent average numbers of residues occurring in the G, M and A blocks of residues, respectively. Subscript x represents the number of segments of M, A and G blocks, i.e., x-segments. Subscripts j, k and l may each be the same or different for each x-segment.

More specifically, structures VII through X may represent polymer chain segment structures which comprise either (1) alternating blocks of residues derived from alternating blocks of M and A; M and G; A and M; and G and M, respectively; or (2) diblocks of residues derived from a block of M and a block of A; a block of M and a block of G; a block of A and a block of M; and a block of G and a block of M, respectively. When structures VII through X represent polymer chain segment structures which comprise alternating blocks of residues, the subscript q for these structures represents the average number of the alternating blocks contained in each x-segment. Alternatively, when structures VII through X represent polymer chain segment structures which comprise diblocks of residues, the subscript q for these structures represents the average number of diblocks contained in each x-segment. As discussed above, the values for subscripts j, k and l and q can be the same or different for each x-segment.

The following are presented for the purpose of illustrating the various polymer architectures that are represented by general polymer chain structures I through X.

WHERE x is 1, j is 2, k is 4, and l is 3, the polymer chain structure is:

-G-G-M-M-M-M-A-A-A-;

WHERE x is 1, j is 1, k is 3, and l is 1, the polymer chain structure is:

-G-M-M-M-A-;

WHERE x is 1, j is 1, k is 1, l is 3, and q is 4, the polymer chain structure is:

-M-G-M-G-M-G-M-G-A-A-A-;

and

WHERE x is 4, j is from 0 to 3, k is from 0 to 3, and l is from 0 to 3, the polymer chain structure can represent a gradient block of G, M and A residues, having the polymer chain structure:

-G-G-G-M-M-A-G-G-M-M-M-A-G-M-M-M-A-A-M-M-M-A-A-.

Gradient copolymers can be prepared from two or more monomers by ATRP methods, and are generally described as having architecture that changes gradually and in a systematic and predictable manner along the polymer backbone. Gradient copolymers can be prepared by ATRP methods by (a) varying the ratio of monomers fed to the reaction medium during the course of the polymerization, (b) using a monomer fees containing monomers having different rates of polymerization, or (c) a combination of (a) and (b). Gradient copolymers are described in further detail on pages 72–78 of International Patent Publication WO 97/18247.

With further reference to general polymer chain structures I through X, M represents one or more types of residues that are free of amine salt groups and different from G and A, and k represents the average total number of M residues occurring per block of M residues (M-block) within an x-segment. The -(M)$_k$- portion of general structures I through X can represent (1) a homoblock of a single type of M residue, (2) an alternating block of two types of M residues, (3) a polyblock of two or more types of M residues, or (4) a gradient block of two or more types of M residues.

Also, with reference to general polymer chain structures I through X, G represents one or more types of residues that contain amine salt groups, and j represents the average total number of G residues occurring per block of G residues (G-block). Accordingly, the $-(G)_j-$ portions of polymer chain structures I through X may be described in a manner similar to that of the $-(M)_k-$ portions provided above.

Likewise, with reference to general polymer chain structures I through X, A represents one or more types of residues that contain active hydrogen groups, usually hydroxyl, and l represents the average total number of A residues occurring per block of A residues (A-block). Accordingly, the $-(A)_l-$ portions of polymer chain structures I through X may be described in a manner similar to that of the $-(M)_k-$ portions provided above.

Residue M of general polymer chain structures I through X is derived from at least one ethylenically unsaturated radically polymerizable monomer. As used herein and in the claims, "ethylenically unsaturated radically polymerizable monomer" and like terms are meant to include vinyl monomers, allylic monomers, olefins and other ethylenically unsaturated monomers that are radically polymerizable.

Classes of vinyl monomers from which M may be derived include, but are not limited to, (meth)acrylates, vinyl aromatic monomers, vinyl halides and vinyl esters of carboxylic acids. As used herein and in the claims, by "(meth) acrylate" and like terms is meant both methacrylates and acrylates. Preferably, residue M is derived from at least one of alkyl (meth)acrylates having from 1 to 20 carbon atoms in the alkyl group, vinyl aromatic monomers and olefins. Specific examples of alkyl (meth)acrylates having from 1 to 20 carbon atoms in the alkyl group from which residue M may be derived include, but are not limited to, methyl (meth)acrylate, ethyl (meth)acrylate, isopropyl (meth) acrylate, butyl (meth)acrylate, tert-butyl (meth)acrylate, 2-ethylhexyl (meth)acrylate, lauryl (meth)acrylate, isobornyl (meth)acrylate, isobutyl (meth)acrylate, cyclohexyl (meth)acrylate, and 3,3,5-trimethylcyclohexyl (meth) acrylate.

Residue M may also be selected from monomers having more than one (meth)acrylate group, for example, (meth) acrylic anhydride and diethyleneglycol bis((meth)acrylate). Residue M may also be selected from alkyl (meth)acrylates containing radically transferable groups, which can act as branching monomers, for example, 2-(2-bromopropionoxy) ethyl acrylate.

Specific examples of vinyl aromatic monomers from which M may be derived include, but are not limited to, styrene, p-chloromethylstyrene, divinyl benzene, vinyl naphthalene and divinyl naphthalene.

Vinyl halides from which M may be derived include, but are not limited to, vinyl chloride and vinylidene fluoride. Vinyl esters of carboxylic acids from which M may be derived include, but are not limited to, vinyl acetate, vinyl versatate, vinyl butyrate, vinyl benzoate, vinyl 3,4-dimethoxy benzoate and the like.

As used herein and in the claims, by "olefin" and like terms is meant unsaturated aliphatic hydrocarbons having one or more double bonds, such as obtained by cracking petroleum fractions. Specific examples of olefins from which M may be derived include, but are not limited to, propylene, 1-butene, 1,3-butadiene, isobutylene and diisobutylene.

As used herein and in the claims, by "allylic monomer(s)" is meant monomers containing substituted and/or unsubstituted allylic functionality, i.e., one or more radicals represented by the following general formula XI,

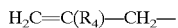

$H_2C=C(R_4)-CH_2-$     XI wherein $R_4$ is hydrogen, halogen or a $C_1$ to $C_4$ alkyl group. Most commonly, $R_4$ is hydrogen or methyl and consequently general formula XI represents the unsubstituted (meth)allyl radical. Examples of allylic monomers include, but are not limited to: (meth)allyl alcohol; (meth)allyl ethers, such as methyl (meth)allyl ether; and (meth)allyl esters of carboxylic acids, such as (meth)allyl acetate.

Other ethylenically unsaturated radically polymerizable monomers from which M may be derived include, but are not limited to, esters of acids that are unsaturated but do not have $\alpha,\beta$-ethylenic unsaturation, e.g., methyl ester of undecylenic acid; and diesters of ethylenically unsaturated dibasic acids, e.g., diethyl maleate.

The block of residue designated $(M)_k$ of the structures above may be derived from one type of monomer or a mixture of two or more monomers. Such mixtures may be random sequences, blocks of monomer residues, or they may be alternating residues.

The residue A may be derived from at least one of hydroxy-alkyl esters of acrylic acid containing from 1 to 4 carbon atoms in the hydroxy-alkyl group and hydroxy-alkyl esters of methacrylic acid containing from 1 to 4 carbon atoms in the hydroxy-alkyl group. Preferably, A is derived from at least one of hydroxy-ethyl (meth)acrylate and hydroxy-propyl (meth)acrylate.

Residue A may also be derived from a beta-hydroxy ester prepared from reacting an ethylenically unsaturated acid functional monomer and an epoxy compound which preferably contains at least 5 carbon atoms. Examples of suitable ethylenically unsaturated acid functional monomers are (meth)acrylic acids. Examples of suitable epoxy compounds are glycidyl esters and ethers. Preferred glycidyl ethers are those containing from 8 to 50 carbon atoms, such as glycidyl ether, butyl glycidyl ether and phenyl glycidyl ether. Examples of suitable glycidyl esters are glycidyl neopentanoate and glycidyl neodecanoate, commercially available from the Shell Chemical Company as CARDURA E.

The block of residue designated $(A)_l$ of the structures above may be derived from one type of monomer or a mixture of two or more monomers. Such mixtures may be random sequences, blocks of monomer residues, or they may be alternating residues.

The residue G is derived from at least one monomer which contains an amine salt group or a group which can be converted to a amine salt group, for example, secondary nitrogen-containing aminoalkyl monomers having from 1 to 6 carbon atoms in the alkyl group, such as tert-butylaminoethyl (meth)acrylate; tertiary nitrogen-containing aminoalkyl monomers having from 1 to 6 carbon atoms in the alkyl group, such as dimethyl aminoethyl (meth)acrylate; and, preferably, epoxy functional monomers, which after polymerization can be post-reacted with an amine, preferably a secondary amine. Examples of epoxy-functional monomers suitable for use in the polymers of the present invention include glycidyl acrylate, glycidyl methacrylate, 3,4-epoxycyclohexylmethyl (meth)acrylate, 2-(3,4-epoxycyclohexylmethyl) (meth)acrylate, and allyl glycidyl ether. Examples of suitable secondary amines are dialkyl and dialkanol amines having 1 to 4 carbon atoms in the alkyl group. After polymerization, the amine functionality is preferably at least partially neutralized with acid to form cationic amine salt groups.

The block of residue designated $(G)_j$ of the structures above may be derived from one type of monomer or a mixture of two or more monomers. Such mixtures may be random sequences, blocks of monomer residues, or they may be alternating residues.

Preferably, the polymer contains at least one of the following structures:

$$\phi\text{-}[\text{-}[\text{-}(G)_j\text{-}(M)_k\text{-}(A)_l\text{-}]_x\text{-}T]_z; \quad (XII)$$

$$\phi\text{-}[\text{-}[\text{-}(G)_j\text{-}(A)_l\text{-}(M)_k\text{-}]_x\text{-}T]_z; \quad (XIII)$$

$$\phi\text{-}[\text{-}[\text{-}(G)_j\text{-}(M)_k\text{-}(A)_l\text{-}]_x\text{-}(Q)_p\text{-}T]_z; \quad (XIV)$$

$$\phi\text{-}[\text{-}[\text{-}(G)_j\text{-}(A)_l\text{-}(M)_k\text{-}]_x\text{-}(Q)_p\text{-}T]_z; \quad (XV)$$

$$\phi\text{-}[\text{-}[\text{-}(M)_k\text{-}(G)_j\text{-}(A)_l\text{-}]_x\text{-}T]_z; \quad (XVI)$$

$$\phi\text{-}[\text{-}[\text{-}(M)_k\text{-}(A)_l\text{-}(G)_j\text{-}]_x\text{-}T]_z; \quad (XVII)$$

$$\phi\text{-}[\text{-}[\text{-}(M)_k\text{-}(G)_j\text{-}(A)_l\text{-}]_x\text{-}(Q)_p\text{-}T]_z; \quad (XVIII)$$

$$\phi\text{-}[\text{-}[\text{-}(M)_k\text{-}(A)_l\text{-}(G)_j\text{-}]_x\text{-}(Q)_p\text{-}T]_z; \quad (XIX)$$

$$\phi\text{-}[\text{-}[\text{-}(A)_l\text{-}(M)_k\text{-}(G)_j\text{-}]_x\text{-}T]_z; \quad (XX)$$

$$\phi\text{-}[\text{-}[\text{-}(A)_l\text{-}(G)_j\text{-}(M)_k\text{-}]_x\text{-}T]_z; \quad (XXI)$$

$$\phi\text{-}[\text{-}[\text{-}(A)_l\text{-}(M)_k\text{-}(G)_j\text{-}]_x\text{-}(Q)_p\text{-}T]_z; \quad (XXII)$$

$$\phi\text{-}[\text{-}[\text{-}(A)_l\text{-}(G)_j\text{-}(M)_k\text{-}]_x\text{-}(Q)_p\text{-}T]_z; \quad (XXIII)$$

$$\phi\text{-}[\text{-}[\text{-}[\text{-}(M)_k\text{-}(A)_l\text{-}]_q\text{-}(G)_j\text{-}]_x\text{-}T]_z; \quad (XXIV)$$

$$\phi\text{-}[\text{-}[\text{-}[\text{-}(M)_k\text{-}(G)_j\text{-}]_q\text{-}(A)_l\text{-}]_x\text{-}T]_z; \quad (XXV)$$

$$\phi\text{-}[\text{-}[\text{-}[\text{-}(A)_l\text{-}(M)_k\text{-}]_q\text{-}(G)_j\text{-}]_x\text{-}T]_z; \quad (XXVI)$$

$$\phi\text{-}[\text{-}[\text{-}[\text{-}(G)_j\text{-}(M)_k\text{-}]_q\text{-}(A)_l\text{-}]_x\text{-}T]_z; \quad (XXVII)$$

$$\phi\text{-}[\text{-}[\text{-}[\text{-}(M)_k\text{-}(A)_l\text{-}]_q\text{-}(G)_j\text{-}]_x\text{-}(Q)_p\text{-}T]_z; \quad (XXVIII)$$

$$\phi\text{-}[\text{-}[\text{-}[\text{-}(M)_k\text{-}(G)_j\text{-}]_q\text{-}(A)_l\text{-}]_x\text{-}(Q)_p\text{-}T]_z; \quad (XXIX)$$

$$\phi\text{-}[\text{-}[\text{-}[\text{-}(A)_l\text{-}(M)_k\text{-}]_q\text{-}(G)_j\text{-}]_x\text{-}(Q)_p\text{-}T]_z; \quad (XXX)$$

or $$\phi\text{-}[\text{-}[\text{-}(G)_j\text{-}(M)_k\text{-}]_q\text{-}(A)_l\text{-}]_x\text{-}(Q)_p\text{-}T]_z; \quad (XXXI)$$

For each of the structures I through X and XII through XXXI, j, k, and l represent average number of residues occurring in a block of residues in each polymer structure. Typically j and l each independently have a value of at least 1 and k is from 0 to 200. Also, j and l each independently have a value of typically less than 50, preferably less than 30 for each general polymer structure. The values of j, k, and l may each range between any combination of these values, inclusive of the recited values. Moreover the sum of j, k and l is at least 2 within an x-segment, j is at least 1 for at least one x-segment, and l is at least 1 within at least one x-segment.

Where occurring in each of the structures XII through XXXI, Q is at least one of any of G, M and A, which are as described above for structures I through X, provided that when Q is derived from an olefin, the adjacent monomer residue is not derived from an olefin. The block of residue $(Q)_p$ may be derived from one type of monomer or a mixture of two or more monomers. Such mixtures may be random sequences, blocks of monomer residues, or they may be alternating residues. For each of structures XII through XXXI which contain $(Q)_p$, the subscript p has a value of at least 1. Typically, p has a value less than 100, preferably less than 50. The value of p may range between any combination of these values, inclusive of the recited values.

For each of the structures XXIV through XXXI, the subscript q has a value of at least 1. When the subscript q represents the average number of alternating monomer blocks within the polymer chain structure segment, q has a value of 1 to 100. Alternatively, when the subscript q represents the average number of monomer diblocks within the polymer chain structure segment, q has a value of 1 to 5. The value for q may range between any combination of these values, inclusive of the recited values.

Subscript x of the structures XII through XXXI typically has a value of at least 1. Also, subscript x typically has a value of less than 10, preferably less than 5, and more preferably less than 3. The value of subscript x may range between any combination of these values, inclusive of the recited values. Moreover, if more than one of the structures XII through XXXI occur in the polymer molecule, x may have different values for each structure, as may j, k and l, allowing for a variety of polymer architectures, such as gradient copolymers.

For each of the structures XII through XXXI, the symbol φ is or is derived from the residue of the initiator used in the ATRP preparation of the polymer, and is free of the radically transferable group of the initiator. For example, when the active hydrogen group-containing polymer is initiated in the presence of benzyl bromide, the symbol φ, more specifically φ-, is the benzyl residue,

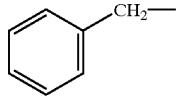

The symbol φ may also be derived from the residue of the initiator. Derivations or conversions of the initiator residue are preferably performed at a point in the ATRP process when loss of any epoxide functionality along the polymer backbone is minimal, for example, prior to incorporating a block of residues having epoxy functionality.

In the structures XII through XXXI, subscript z is equal to the number of active hydrogen group-containing polymer chains that are attached to φ. Subscript z is at least 1 and may have a wide range of values. In the case of comb or graft polymers, wherein φ is a macroinitiator having several pendent radically transferable groups, z can have a value in excess of 10, for example 50, 100 or 1000. Typically, z is less than 10, preferably less than 6 and more preferably less than 5. In a preferred embodiment of the present invention, z is 1 or 2.

The symbol T of the structures XII through XXXI is or is derived from the radically transferable group of the initiator. For example, when the active hydrogen group-containing polymer is prepared in the presence of diethyl-2-bromo-2-methyl malonate, T may be the radically transferable bromo group.

The radically transferable group may optionally be (a) removed or (b) chemically converted to another moiety. In either of (a) or (b), the symbol T is considered herein to be derived from the radically transferable group of the initiator. The radically transferable group may be removed by substitution with a nucleophilic compound, e.g., an alkali metal alkoxylate. However, in the present invention, it is desirable that the method by which the radically transferable group is either removed or chemically converted also be relatively mild with regard to any epoxy functionality of the polymer. Many nucleophilic substitutions and hydrolysis reactions can result in loss of epoxy functionality from the polymer, thereby reducing available sites for post-reaction with secondary amine to form amine salt groups.

In a preferred embodiment of the present invention, when the radically transferable group is a halogen, the halogen can be removed by means of a mild dehalogenation reaction, which does not reduce the epoxy functionality of the polymer. The reaction is typically performed as a post-reaction after the polymer has been formed, and in the presence of at least an ATRP catalyst. Preferably, the halogenation post-reaction is performed in the presence of both an ATRP catalyst and its associated ligand.

The mild dehalogenation reaction is performed by contacting the halogen terminated active hydrogen group-containing polymer of the present invention with one or more ethylenically unsaturated compounds, which are not readily radically polymerizable under at least a portion of the spectrum of conditions under which atom transfer radical polymerizations are performed, hereinafter referred to as "limited radically polymerizable ethylenically unsaturated compounds" (LRPEU compound). As used herein, by "halogen terminated" and similar terms is meant to be inclusive also of pendent halogens, e.g., as would be present in branched, comb and star polymers.

Not intending to be bound by any theory, it is believed, based on the evidence at hand, that the reaction between the halogen terminated active hydrogen group-containing polymer and one or more LRPEU compounds results in (1) removal of the terminal halogen group, and (2) the addition of at least one carbon-carbon double bond where the terminal carbon-halogen bond is broken. The dehalogenation reaction is typically conducted at a temperature in the range of 0° C. to 200° C., e.g., from 0° C. to 160° C., a pressure in the range of 0.1 to 100 atmospheres, e.g., from 0.1 to 50 atmospheres. The reaction is also typically performed in less than 24 hours, e.g., between 1 and 8 hours. While the LRPEU compound may be added in less than a stoichiometric amount, it is preferably added in at least a stoichiometric amount relative to the moles of terminal halogen present in the active hydrogen group-containing polymer. When added in excess of a stoichiometric amount, the LRPEU compound is typically present in an amount of no greater than 5 mole percent, e.g., 1 to 3 mole percent, in excess of the total moles of terminal halogen.

Limited radically polymerizable ethylenically unsaturated compounds useful for dehalogenating the active hydrogen group-containing polymer of the compositions of the present invention under mild conditions include those represented by the following general formula:

XXXII

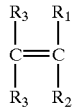

In general formula XXXII, $R_1$ and $R_2$ can be the same or different organic groups such as: alkyl groups having from 1 to 4 carbon atoms; aryl groups; alkoxy groups; ester groups; alkyl sulfur groups; acyloxy groups; and nitrogen-containing alkyl groups where at least one of the $R_1$ and $R_2$ groups is an organo group while the other can be an organo group or hydrogen. For instance when one of $R_1$ or $R_2$ is an alkyl group, the other can be an alkyl, aryl, acyloxy, alkoxy, arenes, sulfur-containing alkyl group, or nitrogen-containing alkyl and/or nitrogen-containing aryl groups. The $R_3$ groups can be the same or different groups selected from hydrogen or lower alkyl selected such that the reaction between the terminal halogen of the active hydrogen group-containing polymer and the LRPEU compound is not prevented. Also an $R_3$ group can be joined to the $R_1$ and/or the $R_2$ groups to form a cyclic compound.

It is preferred that the LRPEU compound be free of halogen groups. Examples of suitable LRPEU compounds include, but are not limited to, 1,1-dimethylethylene, 1,1-diphenylethylene, isopropenyl acetate, alpha-methyl styrene, 1,1-dialkoxy olefin and mixtures thereof. Additional examples include dimethyl itaconate and diisobutene (2,4,4-trimethyl-1-pentene).

For purposes of illustration, the reaction between halogen terminated active hydrogen group-containing polymer and LRPEU compound, e.g., alpha-methyl styrene, is summarized in the following general scheme 1.

General Scheme 1

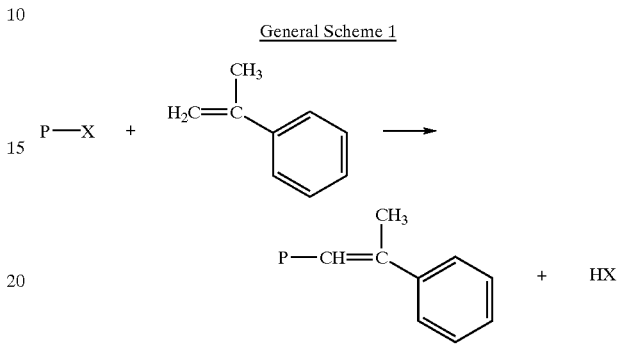

In general scheme 1, P—X represents the halogen terminated active hydrogen group-containing polymer.

The active hydrogen group-containing polymer typically has a amine salt group equivalent weight of at least 1000 grams/equivalent, preferably at least 1500 grams/equivalent. The amine salt group equivalent weight of the polymer is also typically less than 15,000 grams/equivalent, preferably less than 10,000 grams/equivalent, and more preferably less than 6,000 grams/equivalent. The amine salt group equivalent weight of the active hydrogen group-containing polymer may range between any combination of these values, inclusive of the recited values. As used herein, amine salt group equivalent weights are determined in accordance with ASTM-D4370.

Where A represents the residue of a hydroxyl group containing monomer, the polymer typically has a hydroxyl value of at least 50, preferably at least 100 and more preferably at least 300. The hydroxyl value is also typically less than 500, preferably less than 400 and more preferably less than 350. The hydroxyl value may range between any combination of these values inclusive of recited values.

The number average molecular weight ($M_n$) of the active hydrogen group-containing polymer is typically at least 250, and preferably at least 1000. The polymer also typically has a Mn of less than 30,000, preferably less than 25,000 and more preferably less than 20,000. The $M_n$ of the active hydrogen group-containing polymer may range between any combination of these values, inclusive of the recited values. Unless otherwise indicated, all molecular weights described in the specification and claims are determined by gel permeation chromatography using polystyrene standards.

The resultant hydrogen group-containing polymer containing cationic salt groups may have any number of polymer structures and architecture, to include linear polymers, branched polymers, hyperbranched polymers, star polymers, gradient polymers, and graft polymers. Mixtures of one or more of these polymer structures may be useful in the thermosetting compositions of the present invention. Preferably the hydrogen group-containing polymer containing amine salt groups is a linear polymer, where the value of the subscript z is 1 or 2.

It should be understood that the structures XII through XXXI can represent the polymer itself or, alternatively, each of the structures can comprise a terminal segment of the polymer. For example, where z is 1, any of the structures XII through XXXI can represent a linear polymer, prepared by ATRP using an initiator having 1 radically transferable group. Where z is 2, any two of the structures XII through XXXI can represent a linear "leg" extending from the residue of an initiator having 2 radically transferable groups. Alternatively, where z is 2, any two of the structures XII through XXXI can each represent an "arm" of a star polymer prepared by ATRP, using an initiator having more than 2 radically transferable groups.

The active hydrogen group-containing polymer containing amine salt groups may be present in the thermosetting compositions of the invention as a resinous binder (i.e., a film-forming polymer) or as an additive in combination with a separate resinous binder, which may be prepared by atom transfer radical polymerization or by conventional polymerization methods. When used as an additive, for example, for use as a reactive diluent, the active hydrogen group-containing polymer as described herein typically has a high degree of functionality and a correspondingly low equivalent weight. However, it should be appreciated that for other applications, the additive may have low functionality (it may be monofunctional) and a correspondingly high equivalent weight. The active hydrogen group-containing polymer containing amine salt groups is typically present in the thermosetting compositions of the invention in an amount of at least 0.5 percent by weight (when used as an additive) and in an amount of at least 25 percent by weight (when used as a resinous binder), based on total weight of resin solids of the thermosetting composition. The active hydrogen group-containing polymers are also typically present in the thermosetting compositions in an amount of less than 95 percent by weight, and preferably in an amount of less than 80 percent by weight, based on total weight of resin solids of the thermosetting composition. The active hydrogen group-containing polymer may be present in the thermosetting compositions of the invention in an amount ranging between any combination of these values, inclusive of the recited values.

The thermosetting composition of the present invention further comprises (b) a curing agent having at least two functional groups which are reactive with the active hydrogen groups of the polymer (a) described above.

Examples of suitable curing agents for use in the thermosetting compositions of the invention include polyisocyanate and aminoplast curing agents. The preferred curing agents for use in thermosetting compositions of the invention, particularly for cationic electrodeposition, are blocked organic polyisocyanates. The polyisocyanates can be fully blocked as described in U.S. Pat. No. 3,984,299 column 1 lines 1 to 68, column 2 and column 3 lines 1 to 15, or partially blocked and reacted with the polymer backbone as described in U.S. Pat. No. 3,947,338 column 2 lines 65 to 68, column 3 and column 4 lines 1 to 30, which are incorporated by reference herein. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates such as triisocyanates can be used. An example would include triphenylmethane-4,4',4"-triisocyanate. Isocyanate ( )-prepolymers with polyols such as neopentyl glycol and trimethylolpropane and with polymeric polyols such as _polycaprolactone diols and triols (NCO/OH equivalent ratio greater than 1) can also be used.

The polyisocyanate curing agent is typically utilized in conjunction with the active hydrogen group-containing polymer (a) in an amount of at least 1 percent by weight, preferably at least 15 percent by weight, and more preferably at least 25 percent by weight. Also, the polyisocyanate curing agent is typically used in conjunction with the active hydrogen group-containing polymer in an amount of less than 50 percent by weight, and preferably less than 40 percent by weight, based on weight of total resin solids of (a) and (b). The polyisocyanate curing agent may be present in the thermosetting composition of the present invention in an amount ranging between any combination of these values, inclusive of the recited values.

The thermosetting compositions of the present invention are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, preferably less than 0.15 micron.

The concentration of the resinous phase in the aqueous medium is at least 1 and usually from about 2 to about 60 percent by weight based on total weight of the aqueous dispersion. When the compositions of the present invention are in the form of resin concentrates, they generally have a resin solids content of about 20 to about 60 percent by weight based on weight of the aqueous dispersion.

The thermosetting compositions of the invention are typically in the form of electrodeposition baths which are usually supplied as two components: (1) a clear resin feed, which includes generally the active hydrogen-containing polymer which contains amine salt groups, i.e., the main film-forming polymer, the curing agent, and any additional water-dispersible, non-pigmented components; and (2) a pigment paste, which generally includes one or more pigments, a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents. Alternatively, the electrodeposition bath may be supplied as a one-component system which contains the main film-forming polymer, the curing agent, the pigment paste and any optional additives in one package. The one-component system is dispersed in an aqueous medium as described above.

The electrodeposition bath of the present invention has a resin solids content usually within the range of about 5 to 25 percent by weight based on total weight of the electrodeposition bath.

As aforementioned, besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene or propylene glycol. The amount of coalescing solvent is generally between about 0.01 and 25 percent and when used, preferably from about 0.05 to about 5 percent by weight based on total weight of the aqueous medium.

As discussed above, a pigment composition and, if desired, various additives such as surfactants, wetting agents or catalyst can be included in the dispersion. The pigment composition may be of the conventional type comprising pigments, for example, iron oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-resin ratio. In the practice of the invention, when pigment is employed, the pigment-to-resin ratio is usually within the range of about 0.02 to 1:1. The other additives mentioned above are usually in the dispersion in amounts of about 0.01 to 3 percent by weight based on weight of resin solids.

The thermosetting compositions of the present invention can be applied by electrodeposition to a variety of electro-conductive substrates especially metals such as untreated steel, galvanized steel, aluminum, copper, magnesium and conductive carbon coated materials. The applied voltage for electrodeposition may be varied and can be, for example, as low as 1 volt to as high as several thousand volts, but typically between 50 and 500 volts. The current density is usually between 0.5 ampere and 5 amperes per square foot and tends to decrease during electrodeposition indicating the formation of an insulating film.

After the coating has been applied by electrodeposition, it is cured usually by baking at elevated temperatures such as about 90° to about 260° C. for about 1 to about 40 minutes.

The present invention is more particularly described in the following examples, which are intended to be illustrative only, since numerous modifications and variations therein will be apparent to those skilled in the art. Unless otherwise specified, all parts and percentages are by weight.

SYNTHESIS EXAMPLES A–C

Synthesis Examples A through C describe in series the preparation of an amine salt group-containing polymer prepared by atom transfer radical polymerization that is useful in electrodepositable coating compositions according to the present invention. In Synthesis Example A, the following monomer abbreviations are used: glycidyl methacrylate (GMA); iso-butyl methacrylate (IBMA); and 2-hydroxypropyl methacrylate (HPMA).

EXAMPLE A

A triblock precursor polymer was prepared from the ingredients enumerated in Table A. The precursor polymer of this example was converted to an amine group-containing polymer as described in Example B. The triblock precursor polymer of this example is summarized diagrammatically as follows:

TABLE A (GMA) - (IBMA) - (HPMA)

| Ingredients | Parts by weight |
|---|---|
| Charge 1 | |
| toluene | 450.9 |
| copper (II) bromide (a) | 4.6 |
| copper powder (b) | 10.8 |
| 2,2'-bypyridyl | 6.4 |
| diethyl-2-bromo-2-methylmalonate | 43.0 |
| GMA | 217.3 |
| Charge 2 | |
| toluene | 450.9 |
| IBMA | 1474.6 |

TABLE A-continued (GMA) - (IBMA) - (HPMA)

| Ingredients | Parts by weight |
|---|---|
| Charge 3 | |
| toluene | 450.9 |
| HPMA | 294.1 |

(a) The copper (II) bromide was in the form of flakes and was obtained from Aldrich Chemical Company.
(b) The copper powder had an average particle size of 25 microns, a density of 1 gram/cm$^3$, and was obtained commercially from OMG Americas.

Charge 1 was heated to and held at 70° C. for 2 hours in a 2 liter 4-necked flask equipped with a motor driven stainless steel stir blade, water cooled condenser, and a heating mantle and thermometer connected through a temperature feed-back control device. The contents of the flask were heated to 90° C. and Charge 2 was added over a period of 15 minutes, followed by a hold at 90° C. for 3 hours. After cooling the contents of the flask to 70° C., Charge 3 was added over 15 minutes, followed by a hold at 70° C. for 2 hours. The contents of the flask were cooled to room temperature and filtered.

The triblock polymer had a solids of 65 percent by weight, based on total weight (as determined from a 0.2 gram sample at 110° C./1 hour), and an epoxy equivalent weight of 2300 grams/equivalent (as determined by titration with perchloric acid). The triblock polymer was analyzed by gel permeation chromatography (using polystyrene standards) and found to have a number average molecular weight (Mn) of 12,090, a weight average molecular weight (Mw) of 16,926, and a polydispersity index (PDI =Mw/Mn) of 1.4.

EXAMPLE B

The precursor polymer of Example A was converted to an amine group-containing polymer, to which a urethane crosslinker and catalyst were added, as summarized in Table B.

TABLE B

| Ingredients | Parts by weight |
|---|---|
| Charge 1 | |
| polymer solution of Example A | 400.0 |
| 2-butoxy ethanol | 45.5 |
| Charge 2 | |
| deionized water | 100.0 |
| Charge 3 | |
| deionized water | 1.22 |
| N-methyl ethanolamine | 12.2 |
| 2-butoxy ethanol | 20.5 |
| methylisobutyl ketone | 11.7 |
| Charge 4 | |
| urethane crosslinker (c) | 146.0 |
| Charge 5 | |
| dibutyltin diacetate | 4.37 |

(c) A trimethylol propane/isophorone diisocyanate adduct capped with 2-butoxy ethanol, having a percent solids of 65 percent by weight, based on total weight in 2-butoxy ethanol, methylisobutylketone and phenyl 2-hydroxypropyl ether.

Charge 1 was heated to 100° C. in a 1 liter round bottom flask equipped with a motor driven stainless steel stir blade, water cooled reflux condenser, a Dean-Stark trap, and a heating mantle and thermometer connected through a temperature feed-back control device. Charge 2 was added slowly while maintaining the temperature at 100° C., during which time 193 grams of distillate was collected through the Dean-Stark trap. The contents of the flask were cooled to 97° C., and Charge 3 was added followed by a two hour hold at 98° C. While maintaining the contents of the flask at 98° C., Charge 4 was added followed by continued stirring for an additional 60 minutes at 98° C. With the contents of the flask at 98° C., Charge 5 was added, followed by continued stirring for a minimum of 15 minutes.

EXAMPLE C

The amine group-containing polymer and urethane crosslinker mixture of Example B was dispersed in deionized water as summarized in Table C. In dispersing the mixture of Example B, the amine group-containing polymer was converted to an amine salt group-containing polymer.

TABLE C

| Ingredients | Parts by weight |
|---|---|
| Charge 1 | |
| deionized water | 473.4 |
| lactic acid (d) | 10.7 |
| Charge 2 | |
| amine group-containing polymer and urethane crosslinker mixture of Example B | 493.0 |

(d) 88 percent solids by weight in deionized water, based on total solids.

Charge 1 was added to a suitable container at room temperature and stirred vigorously with a stainless steel impeller. Charge 2 (while at a temperature of 98° C.) was added slowly with continuous agitation to the container. The contents of the flask were stirred under vigorous agitation for 60 minutes, after which additional deionized water was added in an amount sufficient to adjust the solids of the dispersion to 24.5 percent by weight, based on total weight (as determined from a 0.5 gram sample at 110° C./1 hour).

Electrodepositable Coating Composition Example

The dispersion of Example C was mixed with deionized water in an amount sufficient to form an electrodepositable coating composition having a solids of 10 percent by weight, based on total weight. The coating composition had a pH of 4.8 and a conductivity of 589 microMhos.

The coating composition was transferred to a suitable non-conductive container, into which was placed a stainless steel anode in electrical contact with a direct current (DC) rectifier. With continuous stirring, the electrodepositable coating composition was heated in a water-bath to a temperature of from 24° C. to 38° C. Cold rolled steel panels (pretreated with zinc phosphate and a chrome seal), were placed in electrical contact with the cathode of the DC rectifier and immersed in the heated coating composition. With the DC application of from 75 to 150 volts, over a period of from 90 to 120 seconds, the electrodepositable coating composition was coated onto the immersed panels. The coated panels were removed from the coating composition, rinsed with deionized water and placed in a 177° C. electric oven for 20 minutes. The coated panels were removed from the oven, and those having a cured film thickness of 25 microns were evaluated further.

The 25 micron thick cured coatings were observed to have smooth continuous defect-free surfaces. The cured coatings were found to have good acetone resistance, showing only slight marring after 100 manual double rubs of the coating surface with an acetone saturated cloth towel.

The present invention has been described with reference to specific details of particular embodiments thereof. It is not intended that such details be regarded as limitations upon the scope of the invention except insofar as and to the extent that they are included in the accompanying claims.

We claim:

1. A method of electrocoating a conductive substrate serving as a cathode in an electrical circuit comprising said cathode and an anode, said cathode and anode being immersed in an aqueous electrocoating composition, comprising passing electric current between said cathode and anode to cause deposition of the electrocoating composition on the substrate as a substantially continuous film, the aqueous electrocoating composition comprising:

(a) an ungelled active hydrogen group-containing block copolymer containing amine salt groups prepared by atom transfer radical polymerization in the presence of an initiator having at least one radically transferable group, wherein said block copolymer contains at least one of the following block copolymer chain structures:

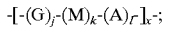

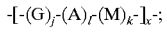

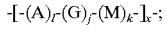

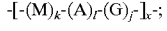

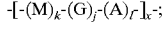

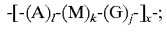

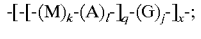

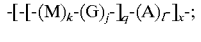

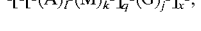

or

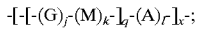

where j, k, l, q and x, each are independently selected for each structure such that said block copolymer has a number average molecular weight of at least 1,000; j, l and x each are independently at least 1; G is a residue of at least one ethylenically unsaturated radically polymerizable monomer, said residue containing amine salt groups; A is a residue of at least one ethylenically unsaturated radically polymerizable monomer, said residue being free of amine salt groups and containing active hydrogen groups; and M is a residue of at least one ethylenically unsaturated radically polymerizable monomer and is different from G and A; and (b) a curing agent having at least two functional groups which are reactive with the active hydrogen groups of (a).

2. The method of claim 1 wherein said active hydrogen group-containing polymer has a number average molecular weight in the range of from 1,000 to 30,000.

3. The method of claim 1 wherein j and l are independently at least 1 and up to 50, k is 0 and up to 200, q is at least 1 and up to 100, and x is at least 1 and up to 10.

4. The method of claim 1 wherein x is within the range of 1 to 3.

5. The method of claim 1 wherein the polymer has an amine salt group equivalent weight of from 1,000 to 15,000 grams/equivalent.

6. The method of claim 1 wherein M is a residue derived from at least one of vinyl monomers, allylic monomers, and olefins.

7. The method of claim 1 wherein M is derived from at least one of alkyl (meth)acrylates having 1 to 20 carbon atoms in the alkyl group, vinyl aromatic monomers and olefins.

8. The method of claim 1 wherein A is derived from at least one of hydroxy-alkyl esters of (meth)acrylic acid containing from 1 to 4 carbon atoms in the hydroxy alkyl group.

9. The method of claim 1 wherein A is derived from at least one of hydroxy-ethyl (meth)acrylate, and hydroxy-propyl (meth)acrylate.

10. The method of claim 1 wherein G is derived from at least one of secondary nitrogen-containing amino monomers, tertiary nitrogen-containing amino monomers, and epoxy functional monomers which after polymerization have been post-reacted with an amine.

11. The method of claim 1 wherein G is derived from at least one of tertiary-butyl aminoethyl(meth)acrylate and dimethyl aminoethyl(meth)acrylate.

12. The method of claim 1 wherein G is derived from at least one epoxy group-containing monomer which after polymerization has been post-reacted with an amine.

13. The method of claim 1 wherein said active hydrogen group-containing polymer is a substantially linear polymer having a number average molecular weight in the range of from 1,000 to 30,000, and wherein G is derived from at least one epoxy group-containing monomer which after polymerization has been post-reacted with a secondary amine, and at least partially neutralized with acid;

A is derived from at least one hydroxy-alkyl (meth) acrylate having 1 to 4 carbon atoms in the alkyl group; and M is derived from at least one of (meth)acrylate monomers, vinyl aromatic monomers, and olefins.

14. The method of claim 13 wherein said polymer has an amine salt group equivalent weight in the range of from 1,000 to 15,000 grams/equivalent.

15. The method of claim 13 wherein said polymer, prior to amine salt group formation, has a polydispersity index of less than 1.5.

16. The method of claim 1 wherein the initiator is selected from the group consisting of linear or branched aliphatic compounds, polycyclic aromatic compounds, heterocyclic compounds, sulfonyl compounds, sulfenyl compounds, esters of carboxylic acids, polymeric compounds and mixtures thereof, each having at least one radically transferable halo group.

17. The method of claim 16 wherein said initiator is selected from at least one of halomethane, methylenedihalide, haloform, carbon tetrahalide, methanesulfonyl halide, p-toluenesulfonyl halide, methanesulfenyl halide, p-toluenesulfenyl halide, 1-phenylethyl halide, 2-halopropionitrile, $C_1$–$C_6$-alkyl ester of 2-halo-$C_1$–$C_6$-carboxylic acid, p-halomethylstyrene, mono-hexakis($\alpha$-halo-$C_1$–$C_6$-alkyl)benzene, and diethylhalo malonate.

18. The method of claim 1 wherein said active hydrogen group-containing polymer has at least one of the following structures:

$\phi$-[-[-(G)$_j$-(M)$_k$-(A)$_l$-]$_x$-T]$_z$;

$\phi$-[-[-(G)$_j$-(A)$_l$-(M)$_k$-]$_x$-T]$_z$;

$\phi$-[-[-(G)$_j$-(M)$_k$-(A)$_l$-]$_x$-(Q)$_p$-T]$_z$;

$\phi$-[-[-(G)$_j$-(A)$_l$-(M)$_k$-]$_x$-(Q)$_p$-T]$_z$;

$\phi$-[-[-(M)$_k$-(G)$_j$-(A)$_l$-]$_x$-T]$_z$;

$\phi$-[-[-(M)$_k$-(A)$_l$-(G)$_j$-]$_x$-T]$_z$;

$\phi$-[-[-(M)$_k$-(G)$_j$-(A)$_l$-]$_x$-(Q)$_p$-T]$_z$;

$\phi$-[-[-(M)$_k$-(A)$_l$-(G)$_j$-]$_x$-(Q)$_p$-T]$_z$;

$\phi$-[-[-(A)$_l$-(M)$_k$-(G)$_j$-]$_x$-T]$_z$;

$\phi$-[-[-(A)$_l$-(G)$_j$-(M)$_k$-]$_x$-T]$_z$;

$\phi$-[-[-(A)$_l$-(M)$_k$-(G)$_j$-]$_x$-(Q)$_p$-T]$_z$;

$\phi$-[-[-(A)$_l$-(G)$_j$-(M)$_k$-]$_x$-(Q)$_p$-T]$_z$;

$\phi$-[-[-[-(M)$_k$-(A)$_l$-]$_q$-(G)$_j$-]$_x$-T]$_z$;

$\phi$-[-[-[-(M)$_k$-(G)$_j$-]$_q$-(A)$_l$-]$_x$-T]$_z$;

$\phi$-[-[-[-(A)$_l$-(M)$_k$-]$_q$-(G)$_j$-]$_x$-T]$_z$;

$\phi$-[-[-[-(G)$_j$-(M)$_k$-]$_q$-(A)$_l$-]$_x$-T]$_z$;

$\phi$-[-[-[-(M)$_k$-(A)$_l$-]$_q$-(G)$_j$-]$_x$-(Q)$_p$-T]$_z$;

$\phi$-[-[-[-(M)$_k$-(G)$_j$-]$_q$-(A)$_l$-]$_x$-(Q)$_p$-T]$_z$;

$\phi$-[-[-[-(A)$_l$-(M)$_k$-]$_q$-(G)$_j$-]$_x$-(Q)$_p$-T]$_z$;

$\phi$-[-[-[-(G)$_j$-(M)$_k$-]$_q$-(A)$_l$-]$_x$-(Q)$_p$-T]$_z$;

where, for each structure, x is at least 1 and up to 10;

j and l are each independently from 1 up to 50, k is from 0 to 200, provided that (j+k+l) is greater than 0; and q, p and z are at least 1;

Q is at least one of any of G, M and A, provided that when Q is derived from an olefin, the adjacent monomer residue is not derived from an olefin;

$\phi$ is or is derived from the residue of said initiator and is free of the radically transferable group; and T is or is derived from the radically transferable group of the initiator.

19. The method of claim 18 wherein said active hydrogen group containing polymer has a number average molecular weight of from 1,000 to 30,000, and has a polydispersity of less than 2.5.

20. The method of claim 18 wherein x is selected for each structure within the range of 1 to 3.

21. The method of claim 18 wherein T is halide.

22. The method of claim 21 wherein the initiator is selected from the group consisting of chloroform, carbon tetrachloride, p-toluenesulfonyl halide, 1-phenylethyl halide, 2-halopropionitrile, $C_1$–$C_6$-alkyl ester of 2-halo-$C_1$–$C_6$-carboxylic acid, p-halomethylstyrene, mono-hexakis ($\alpha$-haloalkyl)benzene and mixtures thereof.

23. The method of claim 22 wherein T is derived from a dehalogenation post-reaction.

24. The method of claim 23 wherein said dehalogenation post-reaction comprises contacting said active hydrogen group-containing polymer with a limited radically polymerizable ethylenically unsaturated compound.

25. The method of claim 24 wherein said limited radically polymerizable ethylenically unsaturated compound is selected from the group consisting of 1,1-dimethylethylene, 1,1-diphenylethylene, isopropenyl acetate, alpha-methylstyrene, 1,1-dialkoxy olefin and combinations thereof.

26. The method of claim 1 wherein said active hydrogen group-containing polymer is selected from the group consisting of linear polymers, branched polymers, hyperbranched polymers, star polymers, graft polymers and mixtures thereof.

27. The method of claim 1 wherein component (a) is a substantially linear polymer; and for each structure of (a) j and l are independently at least 1 and up to 50, q is at least 1 and up to 100; x is at least 1 and up to 10; p is at least 1 and up to 200; and z is 1 to 2.

28. The method of claim 1 wherein component (a) is present in an amount ranging from 25 to 99 weight percent, and component (b) is present in an amount ranging from 1 to 75 weight percent, where weight percentages are based on the total weight of (a) and (b).

* * * * *